United States Patent
Patel et al.

(10) Patent No.: US 12,473,427 B2
(45) Date of Patent: Nov. 18, 2025

(54) TWO COMPONENT (2K) COMPOSITION BASED ON MODIFIED EPOXY RESINS

(71) Applicant: Henkel AG & Co. KGaA, Duesseldorf (DE)

(72) Inventors: Mihirkumar Patel, Pune (IN); Satyanarayana Raju Kutcherlapati, Pune (IN); Jayesh P. Shah, Pune (IN); Dipak Tathe, Maharashtra (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 755 days.

(21) Appl. No.: 17/568,425

(22) Filed: Jan. 4, 2022

(65) Prior Publication Data

US 2022/0127449 A1   Apr. 28, 2022

Related U.S. Application Data

(63) Continuation of application No. PCT/EP2019/068353, filed on Jul. 9, 2019.

(51) Int. Cl.
   *C08L 63/00* (2006.01)
   *C09D 163/00* (2006.01)

(52) U.S. Cl.
   CPC ............ *C08L 63/00* (2013.01); *C09D 163/00* (2013.01); *C08L 2205/03* (2013.01); *C08L 2312/00* (2013.01)

(58) Field of Classification Search
   CPC .. C08L 63/00; C08L 2312/00; C08L 2205/03; C09D 163/00
   See application file for complete search history.

(56) References Cited

U.S. PATENT DOCUMENTS

| | | |
|---|---|---|
| 3,535,342 A | 10/1970 | Emmons |
| 4,218,543 A | 8/1980 | Weber et al. |
| 4,269,945 A | 5/1981 | Vanderhider et al. |
| 4,374,210 A | 2/1983 | Ewen et al. |
| 4,835,289 A | 5/1989 | Brindoepke |
| 4,892,954 A | 1/1990 | Brindoepke et al. |
| 6,129,244 A | 10/2000 | Hoerth |
| 6,565,969 B1 | 5/2003 | Lamon et al. |
| 8,313,006 B2 | 11/2012 | Willner et al. |
| 9,034,946 B2 | 5/2015 | Iezzi et al. |
| 9,273,225 B2 | 3/2016 | Geismann et al. |
| 2003/0153682 A1 | 8/2003 | Sakugawa |
| 2006/0205861 A1 | 9/2006 | Gordon et al. |
| 2008/0161506 A1 | 7/2008 | Martz et al. |
| 2011/0020627 A1 | 1/2011 | Falk et al. |
| 2012/0251729 A1 | 10/2012 | Hortsman et al. |
| 2013/0230726 A1 | 9/2013 | Frick et al. |
| 2014/0179830 A1 | 6/2014 | Burckhardt et al. |
| 2015/0284608 A1* | 10/2015 | Hofstetter ............... C08K 3/36 252/182.14 |
| 2018/0334587 A1 | 11/2018 | Betzig et al. |

FOREIGN PATENT DOCUMENTS

| | | | |
|---|---|---|---|
| CN | 101712749 A | 5/2010 | |
| CN | 104769001 A | 7/2015 | |
| CN | 105899565 A | 8/2016 | |
| CN | 109083280 | * 12/2018 | ............... E04B 1/30 |
| DE | 102009028100 A1 | 2/2011 | |
| EP | 0119840 A1 | 9/1984 | |
| EP | 0520426 B1 | 4/1996 | |
| EP | 1695990 A1 | 8/2006 | |
| GB | 848671 A | 9/1960 | |
| GB | 874430 A | 8/1961 | |
| GB | 889050 A | 2/1962 | |
| GB | 1485925 A | 9/1977 | |
| JP | 2003055439 A | 2/2003 | |
| JP | 2009203266 A | 9/2009 | |
| JP | 2009203402 A | 9/2009 | |
| JP | 2014185263 A | 10/2014 | |
| WO | 2009094295 A1 | 7/2009 | |
| WO | 2011084556 A1 | 7/2011 | |
| WO | 2016094393 A1 | 6/2016 | |
| WO | 2018229583 A1 | 12/2018 | |

OTHER PUBLICATIONS

International Search Report for PCT/EP2019/068353 mailed Mar. 4, 2020.

Lee, Tzong-Ming, et al, "Syntheses of epoxy-bridged polyorganosiloxanes and the effects of terminated alkoxysilanes on cured thermal properties", Journal of Applied Polymer Science, vol. 99, Issue 6, pp. 3491-3499, published Jan. 19, 2006, English abstract only—Cited in examination of co-pending Chinese application.

Yakai, Feng, et al, "Preparation and Performance of Adamantane-Modified Silicone Materials for LED Encapsulation", Journal of Tianjin University (Science and Technology), vol. 52, No. 2, pp. 129-135, with English abstract. Published 2019—Cited in examination of co-pending Chinese application.

(Continued)

*Primary Examiner* — Shane Fang

(74) *Attorney, Agent, or Firm* — Mary K. Cameron

(57) ABSTRACT

The present invention is directed to a two component (2K) composition comprising:

(A) a first component comprising:

a) at least one epoxy resin different from said resin b); and, b) at least one elastomer modified epoxy resin;

(B) a second component comprising:

c) a curative which consists of at least one compound possessing at least two epoxide reactive groups per molecule, said curative being characterized by comprising at least one alkoxy-containing aminofunctional silicone resin, wherein said composition is characterized in that it is free of catalysts.

17 Claims, No Drawings

(56) References Cited

OTHER PUBLICATIONS

Wu, Yanfen, "Preparation and performance study of high temperature and wear resistant silicone modified epoxy resin composite coating", Chinese Excellent Master Thesis Full Text Database Engineering & Technology vol. 1, crude translation), Issue #2, pages B06 to 79. Published 2014—Cited in examination of co-pending Chinese application.

Gupta, Prashant, et al, "Development of Siliconized Epoxy Resins and Their ApplicationCoatings", Advances in Chemical Engineering and Science, 2011, 1, pp. 133-139, doi: 10.4236/aces.2011. 13020 Published Online Jul. 2011 (http://www.SciRP.org/journal/aces).

T. Sadeddin et al, "Characterization and corrosion performance of epoxy siloxane/organoclay coatings", 32nd International Power System Conference (2017), 4 pages—Cited in specification.

S. Ulaeto et al, "Developments in smart anticorrosive coatings with multifunctional characteristics", Progress in Organic Coatings, 111 (2017) pp. 294-314—Cited in specification.

S. Giaveri et al, "IPN Polysiloxane-Epoxy Resin for High Temperature Coatings: Structure Effects on Layer Performance after 450o Treatment", Coatings 2017, 7(12), 213; https://doi.org/10.3390/coatings7120213—Cited in specification.

* cited by examiner

TWO COMPONENT (2K) COMPOSITION BASED ON MODIFIED EPOXY RESINS

FIELD OF THE INVENTION

The present invention is directed to a two component (2K) composition based on modified epoxy resins. More particularly, the present invention is directed to a two component (2K) composition comprising, as a first component, a combination of epoxy resins and, as a second component, a curative comprising at least one alkoxy-containing amino-functional silicone resin: the reaction of the two components of said composition provides a cured product exhibiting abrasion and corrosion resistance.

BACKGROUND OF THE INVENTION

Epoxy resins have found a broad range of application, predominantly on the basis that a particular selection of resin and cross-linking agent (or curative) can allow the properties of the cured epoxy resin to be tailored to achieve specific performance characteristics.

That versatility being acknowledged, properly cured epoxy resins also possess a plurality of other positive attributes including inter alia: excellent chemical resistance, particularly to alkaline environments; high tensile and compressive strengths; high fatigue strength; low shrinkage upon cure; and, electrical insulation properties and retention thereof upon aging or environmental exposure. However, as identified by Sadeddin et al. 32nd Power System Conference (2017) cured epoxy resin systems can also be adversely characterized by diminished fracture resistance and impact strength, low thermal stability, low pigment retention capacity, poor flexibility and poor hydrophobicity.

To mitigate these negative properties, certain authors have proposed the addition of modifiers—such as rubber or silicones— to the epoxy resins. For illustrative purposes, reference in this regard may be made to: Ualeto et al. *Developments in Smart Anticorrosive Coatings with Multifunctional Characteristics*, Progress in Organic Coatings Volume 111, 294-314 (2017); and, Giaveri et al. *Polysiloxane-Epoxy Resin for High Temperature Coatings: Structure Effects on Layer Performance after* 450° C. Treatment, https://doi.org/10.3390/coatings7120213, wherein an interpenetrating polymer network (IPN) of binders is formed by simultaneous polymerization of silicone and epoxy prepolymers.

Whilst the incorporation of siloxane, as a modifier, into compositions based on epoxy resins has tended to be through physical blending, such blending can promote a deleterious increase in viscosity of the system and even phase separation and bleeding of the siloxane component from the so-blended system. Moreover, when these blended systems are cured under catalysis, the fast rate of cure can prevent adequate leveling in certain coatings, adhesives or sealant applications but also limit the breathing of the material: upon curing, any moisture trapped below the surface of the coating, adhesive or sealant composition may evaporate and induce bubbling or buckling in the cured composition or at least nano-scale material failure. Of course, material failure starts at nano-scale, which enlarges to micro- and then to macro-scale: exposure to abrasive conditions can accelerate this sequence of failure.

A further problem of fast curing blended systems is that the catalyzed reactions can promote a gelation of the curing composition which restricts molecular motion of the reactant (macro)monomers and thereby retards the proper development of the physical properties sought. To obviate such gelation but equally to obviate over-plasticization of the curing composition, there must be critical control of the macromonomer blending ratio, the resin(s) to hardener ratio and the catalysts employed.

The present inventors have recognized that a need exists to develop curable compositions based on silicone modified epoxy resins which are stable in storage and can achieve a complete cure, without compromising the physical properties of the cured product.

STATEMENT OF THE INVENTION

In accordance with a first aspect of the present invention there is provided a two component (2K) composition comprising:
  (A) a first component comprising:
    a) at least one epoxy resin different from said resin b); and,
    b) at least one elastomer modified epoxy resin;
  (B) a second component comprising:
    c) a curative which consists of at least one compound possessing at least two epoxide reactive groups per molecule, said curative being characterized by comprising at least one alkoxy-containing aminofunctional silicone resin,
wherein said composition is characterized in that it is free of catalysts.

In a number of embodiments, the two component (2K) composition comprises:
  A) a first component comprising, based on the weight of said first component:f
    from 10 to 60 wt. % of a) said at least one epoxy resin a);
    from 1 to 40 wt. % of b) at least one elastomer modified epoxy resin b);
  B) a second component comprising:
    c) a curative which consists of at least one compound possessing at least two epoxide reactive groups per molecule, said curative being characterized by comprising at least one alkoxy-containing aminofunctional silicone resin,
wherein said two component composition is characterized in that it is free of catalysts and is further characterized in that the molar ratio of epoxide reactive groups provided in said curative c) to epoxide groups is from 0.90:1 to 1.2:1, preferably from 0.9:1 to 1.1:1.

It is preferred that the elastomer modified epoxy resin b) has an epoxide equivalent weight of from 200 to 2500 g/eq., for example from 200 to 500 g/eq. Independently of or additional to that equivalency characterization, said at least one elastomer functionalized epoxy resin b) should desirably either comprise or consist of at least one dimer acid-modified epoxy resin. Notably, good results have been achieved where said at least one dimer acid-modified epoxy resin is obtainable as the product of catalyzed addition reaction between an epoxide compound and C36 to C44 aliphatic diacid.

It is preferred that said curative c) comprises at least one alkoxy-containing aminofunctional silicone resin ($C^1$) having at least two amine hydrogen atoms per molecule, having an amine hydrogen equivalent weight of from 100 to 1500 g/eq. and having a total alkoxy content (AC) of from 10 to 40 mole percent based on the number of moles of silicon, said resin ($C^1$) comprising the units:

$$(R_3Si(OR')_wO_{(1-w)/2})_a \quad \text{(i);}$$

$$(R_2Si(OR')_xO_{(2-x)/2})_b \quad \text{(ii);}$$

$$(RSi(OR')_yO_{(3-y)/2})_c \quad \text{(iii); and,}$$

$$(Si(OR')_zO_{(4-z)/2})_d \quad \text{(iv)}$$

wherein: each R is independently selected from a $C_1$-$C_{18}$ alkyl group, a $C_6$-$C_{18}$ aryl group, or an aminofunctional hydrocarbon group having the formula —$R^2NHR^3$ or —$R^2NHR^2NHR^3$ of which each $R^2$ is independently a $C_2$-$C_{20}$ alkylene group and $R^3$ is a $C_1$-$C_6$ alkyl group;

a, b, c, and d define the mole fractions of each unit (i) to (iv) respectively, such that a+b+c+d=1; and, w, x, y, and z define the mole fractions of alkoxy groups such that 0≤w<1, 0≤x<2, 0≤y<3, and, 0≤z<4.

Having regard to said alkoxy-containing aminofunctional silicone resin ($C^1$), it is favored for each R to be independently selected from a $C_1$-$C_6$ alkyl group, a $C_6$-$C_{18}$ aryl group or an aminofunctional hydrocarbon group having the formula —$R^1NHR^2$ or —$R^1NHR^1NHR^2$ of which each $R^1$ is independently a $C_2$-$C_8$ alkylene group and $R^2$ is a $C_1$-$C_2$ alkyl group. Moreover, good results have been obtained where that alkoxy-containing aminofunctional silicone resin ($C^1$) has both methyl and phenyl substitution at R.

Without wishing to be bound by theory, the present composition cures in the absence of catalysis by a dual cure mechanism: the reaction of the amine hydrogen atoms of the alkoxy-containing aminofunctional silicone resin curative with the epoxide groups; and, the self-condensation of the reactive alkoxy groups of that curative compound. This curing mechanism has been found be effective under ambient conditions and results in a highly cross-linked system. Moreover, despite the absence of a catalyst, the open time of the compositions is not considered depreciatory.

In accordance with a second aspect of the present invention, there is provided a cured product obtained from the two component (2K) composition as defined herein above and in the appended claims. The present invention further relates to the application and reaction of the two component (2K) composition to form a cured reaction product as a coating, sealant or adhesive.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps. If used, the phrase "consisting of" is closed and excludes all additional elements. Further, the phrase "consisting essentially of" excludes additional material elements but allows the inclusion of non-material elements that do not substantially change the nature of the invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred", "preferably", "desirably" and "particularly", and synonyms thereof, are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

As used herein, room temperature is 23° C. plus or minus 2° C. As used herein, "ambient conditions" means the temperature and pressure of the surroundings in which the composition is located or in which a coating layer or the substrate upon which said coating layer is located.

As used herein, the term "equivalent (eq.)" relates, as is usual in chemical notation, to the relative number of reactive groups present in the reaction.

The term "equivalent weight" as used herein refers to the molecular weight divided by the number of a function concerned. As such, "epoxy equivalent weight" (EEW) means the weight of resin, in grams, that contains one equivalent of epoxy. Equally, the "amine hydrogen equivalent weight" (AHEW) is the weight of the organic amine, in grams, that contains one amine hydrogen.

As used herein, the term "(co)polymer" includes homopolymers, copolymers, block copolymers and terpolymers.

As used herein, the term "epoxide" denotes a compound characterized by the presence of at least one cyclic ether group, namely one wherein an ether oxygen atom is attached to two adjacent carbon atoms thereby forming a cyclic structure. The term is intended to encompass monoepoxide compounds, polyepoxide compounds (having two or more epoxide groups) and epoxide terminated prepolymers. The term "monoepoxide compound" is meant to denote epoxide compounds having one epoxy group. The term "polyepoxide compound" is meant to denote epoxide compounds having at least two epoxy groups. The term "diepoxide compound" is meant to denote epoxide compounds having two epoxy groups.

The epoxide may be unsubstituted but may also be inertly substituted. Exemplary inert substituents include chlorine, bromine, fluorine and phenyl.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{30}$alkyl" group refers to a monovalent group that contains from 1 to 30 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-18 carbon atoms ($C_1$-$C_{18}$ alkyl)—for example unsubstituted alkyl groups containing from 1 to 12 carbon atoms ($C_1$-$C_{12}$ alkyl) or from 1 to 6 carbon atoms ($C_1$-$C_6$ alkyl)—should be noted.

The term "$C_3$-$C_{30}$ cycloalkyl" is understood to mean a saturated, mono-, bi- or tricyclic hydrocarbon group having from 3 to 30 carbon atoms. In general, a preference for cycloalkyl groups containing from 3-18 carbon atoms ($C_3$-$C_{18}$ cycloalkyl groups) should be noted. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl; tetrahydronaphthyl, tetrahydroindenyl; tetrahydroanthracenyl; and, anthracenyl. And a preference for phenyl groups may be noted.

As used herein, "$C_2$-$C_{20}$ alkenyl" refers to hydrocarbyl groups having from 2 to 20 carbon atoms and at least one unit of ethylenic unsaturation. The alkenyl group can be straight chained, branched or cyclic and may optionally be substituted. The term "alkenyl" also encompasses radicals having "cis" and "trans" configurations, or alternatively, "E" and "Z" configurations, as appreciated by those of ordinary skill in the art. In general, however, a preference for unsubstituted alkenyl groups containing from 2 to 10 ($C_{2-10}$) or 2 to 8 ($C_{2-8}$) carbon atoms should be noted. Examples of said $C_2$-$C_{12}$ alkenyl groups include, but are not limited to: —CH=$CH_2$; —C=$CHCH_3$; —$CH_2$CH=$CH_2$; —C(=$CH_2$)($CH_3$); —C=$CHCH_2CH_3$; —$CH_2$CH=$CHCH_3$; —$CH_2CH_2$CH=$CH_2$; —C=$C(CH_3)_2$; —$CH_2$C(=$CH_2$)($CH_3$); —C(=$CH_2$)$CH_2CH_3$; —C($CH_3$)=$CHCH_3$; —C($CH_3$)CH=$CH_2$; —C=$CHCH_2CH_2CH_3$; —$CH_2$CH=$CHCH_2CH_3$; —$CH_2CH_2$CH=$CHCH_3$; —$CH_2CH_2CH_2$CH=$CH_2$; —C(=$CH_2$)$CH_2CH_2CH_3$; —C($CH_3$)=$CHCH_2CH_3$; —CH($CH_3$)CH=$CHCH$; —CH($CH_3$)$CH_2$CH=$CH_2$; —$CH_2$CH=C($CH_3$)$_2$; 1-cyclopent-1-enyl; 1-cyclopent-2-enyl; 1-cyclopent-3-enyl; 1-cyclohex-1-enyl; 1-cyclohex-2-enyl; and, 1-cyclohexyl-3-enyl.

As used herein, "alkylaryl" refers to alkyl-substituted aryl groups and "substituted alkylaryl" refers to alkylaryl groups further bearing one or more substituents as set forth above.

The term "hetero" as used herein refers to groups or moieties containing one or more heteroatoms, such as N, O, Si and S. Thus, for example "heterocyclic" refers to cyclic groups having, for example, N, O, Si or S as part of the ring structure. "Heteroalkyl" and "heterocycloalkyl" moieties are alkyl and cycloalkyl groups as defined hereinabove, respectively, containing N, O, Si or S as part of their structure.

As used herein, the term "catalytic amount" means a sub-stoichiometric amount of catalyst relative to a reactant, except where expressly stated otherwise.

As employed herein a "primary amino group" refers to an $NH_2$ group that is attached to an organic radical, and a "secondary amino group" refers to an NH group that is attached to two organic radicals, which may also together be part of a ring. Where used, the term "amine hydrogen" refers to the hydrogen atoms of primary and secondary amino groups.

Where "amine number" is mentioned herein, this is determinable by titration of the amine acetate ion by a dilute, typically 1N $HC_1$ solution. For a pure material, the amine number can be calculated using the molecular weights of the pure compound and KOH (56.1 g/mol). Instructive guidance may be found, for illustration, in https://dowac.custhelp.com/app/answer/detail/a_id12987.

"Two-component (2K) compositions" in the context of the present invention are understood to be compositions in which a binder component (A) and a hardener component (B) must be stored in separate vessels because of their (high) reactivity. The two components are mixed only shortly before application and then react, typically without additional activation, with bond formation and thereby formation of a polymeric network. Herein higher temperatures may be applied in order to accelerate the cross-linking reaction.

Viscosities of the coating compositions described herein are, unless otherwise stipulated, measured using the Brookfield Viscometer, Model RVT at standard conditions of 20° C. and 50% Relative Humidity (RH). The viscometer is calibrated using silicone oils of known viscosities, which vary from 5,000 cps to 50,000 cps. A set of RV spindles that attach to the viscometer are used for the calibration. Measurements of the coating compositions are done using the No. 6 spindle at a speed of 20 revolutions per minute for 1 minute until the viscometer equilibrates. The viscosity corresponding to the equilibrium reading is then calculated using the calibration.

The term "polyol" as used herein shall include diols and higher functionality hydroxyl compounds.

The hydroxyl (OH) values given herein are measured according to Japan Industrial Standard (JIS) K-1557, 6.4. The isocyanate content values given herein are measured according to EN ISO 1 1909.

The molecular weights referred to in this specification can be measured with gel permeation chromatography (GPC) using polystyrene calibration standards, such as is done according to ASTM 3536.

As used herein, "anhydrous" means the relevant composition includes less than 0.25% by weight of water. For example, the composition may contain less than 0.1% by weight of water or be completely free of water. The term "essentially free of solvent" should be interpreted analogously as meaning the relevant composition comprises less than 0.25% by weight of solvent.

DETAILED DESCRIPTION OF THE INVENTION a) Epoxide Compounds

The two (2K) component composition of the present invention should typically comprise epoxy resins a) in an amount of from 10 to 60 wt. %, preferably from 10 to 40 wt. % based on the weight of the first component thereof. In an alternative expression of the preferred constitution of the present composition, which is not intended to be mutually exclusive of that mentioned above, the composition may contain from 5 to 40 wt. %, based on the weight of the composition of epoxy resin(s) a). For example, the composition of the present invention may contain from 5 to 30 wt. %, for example from 5 to 20 wt. % of said epoxy resin(s) a), based on the weight of the composition.

Epoxy resins as used herein may include mono-functional epoxy resins, multi- or poly-functional epoxy resins, and combinations thereof. The epoxy resins may be pure compounds but equally may be mixtures epoxy functional compounds, including mixtures of compounds having different numbers of epoxy groups per molecule. An epoxy resin may be saturated or unsaturated, aliphatic, cycloaliphatic, aromatic or heterocyclic and may be substituted. Further, the epoxy resin may also be monomeric or polymeric.

Without intention to limit the present invention, illustrative monoepoxide compounds include: alkylene oxides; epoxy-substituted cycloaliphatic hydrocarbons, such as cyclohexene oxide, vinylcyclohexene monoxide, (+)-cis-limonene oxide, (+)-cis,trans-limonene oxide, (−)-cis,trans-limonene oxide, cyclooctene oxide, cyclododecene oxide and a-pinene oxide; epoxy-substituted aromatic hydrocarbons; monoepoxy substituted alkyl ethers of monohydric alcohols or phenols, such as the glycidyl ethers of aliphatic, cycloaliphatic and aromatic alcohols; monoepoxy-substituted alkyl esters of monocarboxylic acids, such as glycidyl esters of aliphatic, cycloaliphatic and aromatic monocarboxylic acids; monoepoxy-substituted alkyl esters of polycarboxylic acids wherein the other carboxy group(s) are esterified with alkanols; alkyl and alkenyl esters of epoxy-substituted monocarboxylic acids; epoxyalkyl ethers of polyhydric alcohols wherein the other OH group(s) are esterified or etherified with carboxylic acids or alcohols; and, monoesters of polyhydric alcohols and epoxy monocarboxylic acids, wherein the other OH group(s) are esterified or etherified with carboxylic acids or alcohols.

By way of example, the following glycidyl ethers might be mentioned as being particularly suitable monoepoxide compounds for use herein: methyl glycidyl ether; ethyl glycidyl ether; propyl glycidyl ether; butyl glycidyl ether; pentyl glycidyl ether; hexyl glycidyl ether; cyclohexyl glycidyl ether; octyl glycidyl ether; 2-ethylhexyl glycidyl ether; allyl glycidyl ether; benzyl glycidyl ether; phenyl glycidyl ether; 4-tert-butylphenyl glycidyl ether; 1-naphthyl glycidyl ether; 2-naphthyl glycidyl ether; 2-chlorophenyl glycidyl ether; 4-chlorophenyl glycidyl ether; 4-bromophenyl glycidyl ether; 2,4,6-trichlorophenyl glycidyl ether; 2,4,6-tribromophenyl glycidyl ether; pentafluorophenyl glycidyl ether; o-cresyl glycidyl ether; m-cresyl glycidyl ether; and, p-cresyl glycidyl ether.

In an important embodiment, the monoepoxide compound conforms to Formula (III) herein below:

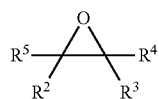

(III)

wherein: $R^2$, $R^3$, $R^4$ and $R^5$ may be the same or different and are independently selected from hydrogen, a halogen atom, a $C_1$-$C_8$ alkyl group, a $C_3$ to $C_{10}$ cycloalkyl group, a $C_2$-$C_{12}$ alkenyl, a $C_6$-$C_{18}$ aryl group or a $C_7$-$C_{18}$ aralkyl group, with the proviso that at least one of $R^3$ and $R^4$ is not hydrogen.

It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Having regard to this embodiment, exemplary monoepoxides include: ethylene oxide; 1,2-propylene oxide (propylene oxide); 1,2-butylene oxide; cis-2,3-epoxybutane; trans-2,3-epoxybutane; 1,2-epoxypentane; 1,2-epoxyhexane; 1,2-heptylene oxide; decene oxide; butadiene oxide; isoprene oxide; and, styrene oxide.

In the present invention, reference is made to using at least one monoepoxide compound selected from the group consisting of: ethylene oxide; propylene oxide; cyclohexene oxide; (+)-cis-limonene oxide; (+)-cis,trans-limonene oxide; (−)-cis,trans-limonene oxide; cyclooctene oxide; and, cyclododecene oxide.

Again, without intention to limit the present invention, suitable polyepoxide compounds may be liquid, solid or in solution in solvent. Further, such polyepoxide compounds should have an epoxide equivalent weight of from 100 to 700 g/eq, for example from 120 to 320 g/eq. And generally, diepoxide compounds having epoxide equivalent weights of less than 500 g/eq. or even less than 400 g/eq. are preferred: this is predominantly from a costs standpoint, as in their production, lower molecular weight epoxy resins require more limited processing in purification.

As examples of types or groups of polyepoxide compounds which may be polymerized in present invention, mention may be made of: glycidyl ethers of polyhydric alcohols and polyhydric phenols; glycidyl esters of polycarboxylic acids; and, epoxidized polyethylenically unsaturated hydrocarbons, esters, ethers and amides.

Suitable diglycidyl ether compounds may be aromatic, aliphatic or cycloaliphatic in nature and, as such, can be derivable from dihydric phenols and dihydric alcohols. And useful classes of such diglycidyl ethers are: diglycidyl ethers of aliphatic and cycloaliphatic diols, such as 1,2-ethanediol, 1,4-butanediol, 1,6-hexanediol, 1,8-octanediol, 1,12-dodecanediol, cyclopentane diol and cyclohexane diol; bisphenol A based diglycidylethers; bisphenol F diglycidyl ethers; diglycidyl o-phthalate, diglycidyl isophthalate and diglycidyl terephthalate; polyalkyleneglycol based diglycidyl ethers, in particular polypropyleneglycol diglycidyl ethers; and, polycarbonatediol based glycidyl ethers. Other suitable diepoxides which might also be mentioned include: diepoxides of double unsaturated fatty acid C1-C18 alkyl esters; butadiene diepoxide; polybutadiene diglycidyl ether; vinylcyclohexene diepoxide; and, limonene diepoxide.

Further illustrative polyepoxide compounds include but are not limited to: glycerol polyglycidyl ether; trimethylolpropane polyglycidyl ether; pentaerythritol polyglycidyl ether; diglycerol polyglycidyl ether; polyglycerol polyglycidyl ether; and, sorbitol polyglycidyl ether.

Glycidyl esters of polycarboxylic acids having utility in the present invention are derived from polycarboxylic acids which contain at least two carboxylic acid groups and no other groups reactive with epoxide groups. The polycarboxylic acids can be aliphatic, cycloaliphatic, aromatic and heterocyclic. The preferred polycarboxylic acids are those which contain not more than 18 carbon atoms per carboxylic acid group of which suitable examples include but are not limited to: oxalic acid; sebacic acid; adipic acid; succinic acid; pimelic acid; suberic acid; glutaric acid; dimer and trimer acids of unsaturated fatty acids, such as dimer and trimer acids of linseed fatty acids; phthalic acid; isophthalic acid; terephthalic acid; trimellitic acid; trimesic acid; phenylene-diacetic acid; chlorendic acid; hexahydrophthalic acid, in particular hexahydroorthophthalic acid (1,2-cyclohexanedicarboxylic acid); diphenic acid; naphthalic acid; polyacid terminated esters of di-basic acids and aliphatic polyols; polymers and co-polymers of (meth)acrylic acid; and, crotonic acid.

And examples of highly preferred polyepoxide compounds include: bisphenol-A epoxy resins, such as DER™331, DER™383 and Epotec YD 128; bisphenol-F epoxy resins, such as DER™354; bisphenol-A/F epoxy resin blends, such as DER™353; aliphatic glycidyl ethers, such as DER™736; polypropylene glycol diglycidyl ethers, such as DER™732; solid bisphenol-A epoxy resins, such as DER™661 and DER™664 UE; solutions of bisphenol-A solid epoxy resins, such as DER™671-X75; epoxy novolac resins, such as DEN™438; brominated epoxy resins such as DER™542; castor oil triglycidyl ether, such as ERISYS™

GE-35H; polyglycerol-3-polyglycidyl ether, such as ERISYS™ GE-38; sorbitol glycidyl ether, such as ERISYS™GE-60; and, bis(2,3-epoxypropyl)cyclohexane-1,2-dicarboxylate, available as Lapox Arch-11.

Whilst it is does not represent a preferred embodiment, the present invention does not preclude the curable compositions further comprising one or more cyclic monomers selected from the group consisting of: oxetanes; cyclic carbonates; cyclic anhydrides; and, lactones. The disclosures of the following citations may be instructive in disclosing suitable cyclic carbonate functional compounds: U.S. Pat. Nos. 3,535,342; 4,835,289; 4,892,954; UK Patent No. GB-A-1,485,925; and, EP-A-0 119 840. However, such cyclic co-monomers should constitute less than 20 wt. %, preferably less than 10 wt. % or less than 5 wt. %, based on the total weight of the epoxide compounds.

b) Elastomer Modified Epoxy Resin

The two component (2K) composition of the present invention necessarily comprises an elastomer modified epoxy resin, which resin should desirably have an epoxide equivalent weight of from 200 to 2500 g/eq., for example from 200 to 500 g/eq.

Without intention to limit the present invention, it is preferred that said elastomer modified epoxy resin b) constitutes from 1 to 40 wt. %, preferably from 5 to 30 wt. % of the first component of the composition. In an alternative expression of the desirable constitution of the present composition, which is not intended to be mutually exclusive of that mentioned above, the composition contains from 1 to 20 wt. %, preferably from 1 to 15 wt. % of said elastomer modified epoxy resin b), based on the weight of the composition.

Elastomer modification of an epoxy resin (hereinafter denoted El) may be conducted by any suitable method known to the skilled artisan but it should generally be performed through a catalyzed addition reaction between the functional groups of the modifier (hereinafter denoted M1) and the oxirane groups of the epoxy resin (E1). Such an addition reaction may be conducted in a suitable solvent and under at least one of following conditions: i) a temperature of from 40° C. to 200° C.; ii) a reaction duration of from 0.5 to 5 hours; and, iii) catalysis. Exemplary catalysts include: tertiary amine catalysts, such as tributylamine; quaternary ammonium salts, such as tetrabutylammonium chloride; tertiary phosphates, such as triphenylphosphate; quaternary phosphonium salts, such as ethyltriphenyl phosphonium iodide (ETPPI); metal salts, such as AMC-2 (a chromium octoate salt); and, combinations of these catalysts where staged addition reactions are effected.

The epoxy resin (E1) to be modified has a 1,2-epoxy equivalency of greater than one and preferably of at least 2. The epoxy resin (E1) may be linear or branched, saturated or unsaturated, aliphatic, cycloaliphatic, aromatic or heterocyclic. And as examples of epoxy resins (E1), there may be mentioned: polyglycidyl ethers of polyhydric compounds; brominated epoxies; epoxy novolacs or similar polyhydroxyphenol resins; polyglycidyl ethers of glycols or polyglycols; and, polyglycidyl esters of polycarboxylic acids. A preference may be acknowledged for the use of a polyglycidyl ether of a polyhydric phenol as said epoxy resin (E1).

The functionalized modifier (M1) is functionalized—either terminally or non-terminally—with a group which is reactive to the oxirane group of the epoxy resin (E1). Suitable functional groups include but are not limited to: carboxyl; amino; hydroxyl; epoxy; mercaptan; anhydride; and, isocyanate. In addition, the modifier (M1) may be a functionalized homo-polymer or a functionalized random, block or star copolymer.

In an important embodiment, the functional modifier (M1) used to modify the epoxy resin (E1) is a functionally-terminated diene-containing polymer having the general formula:

wherein: B is a polymer backbone polymerized from monomers selected from: $C_4$-$C_{10}$ dienes; $C_4$-$C_{10}$ dienes and at least one vinyl aromatic monomer, such as styrene, $C_1$-$C_6$ alkyl-substituted styrene, or halogen-substituted styrene; $C_4$-$C_{10}$ dienes and at least one vinyl nitrile monomer, such as acrylonitrile or methacrylonitrile; $C_4$-$C_{10}$ dienes, at least one vinyl nitrile monomer and at least one vinyl aromatic monomer; or, $C_4$-$C_{10}$ dienes, at least one vinyl nitrile monomer and an acrylate of the formula $CH_2$=$CR$—$COOR^1$ wherein R and $R^1$ are independently of one another selected from hydrogen or $C_1$-$C_{10}$ alkyl groups; and, X can be any functional group that can react with an oxirane group, of which suitable examples include carboxy, amino, hydroxyl, epoxy, mercaptan, anhydride and isocyanate groups.

As the reactant modifier (M1), the functionally-terminated diene-containing polymer should typically be characterized by a functionality of from 1.1 to 2.5, for example from 1.5 to 2.5 or from 1.6 to 2.4. That aside, it is not precluded that the backbone (X) of the polymer be partially hydrogenated.

By way of non-limiting example, the functionally-terminated diene-containing polymer (M1) may be selected from: carboxyl-terminated polybutadiene; carboxyl-terminated poly(butadiene-acrylonitrile); and, carboxyl-terminated poly(butadiene-acrylonitrile-acrylic acid).

A preference as modifier (M1) for carboxyl-terminated poly(butadiene-acrylonitrile) (CTBN) may be noted and in particular for carboxyl-terminated poly(butadiene-acrylonitrile) (CTBN) constituted by: from 5 to 30 wt. % acrylonitrile; and, from 70 to 95 wt. % butadiene. Independently or additionally to this constitution, the carboxyl-terminated poly(butadiene-acrylonitrile) (CTBN) should have a number average molecular weight (Mn) of from 1000 to 50000 g/mol, for example from 2000 to 10000 g/mol. Further, the carboxyl-terminated poly(butadiene-acrylonitrile) is not precluded from including other functional groups—such as amino, phenolic, hydroxyl, epoxy, mercaptan or anhydride groups—pendent on the chain, in addition to the terminal carboxyl groups.

Aside from functionally-terminated diene-containing polymers, the use of diene-containing polymers functionalized non-terminally along the chain skeleton may be useful in some embodiments. Such functionalized polymers (M1) might include, by way of example: carboxylated polybutadiene; carboxylated poly(butadiene-styrene); mid-block carboxylated poly(styrene-ethylene/butadiene-styrene); amidated poly(butadiene-styrene); mercapto-polybutadiene; epoxidized polybutadiene; and, epoxidized poly(butadiene-styrene).

In a further embodiment of the present invention, the two component (2K) composition is characterized in that said at least one elastomer functionalized epoxy resin either comprises or consists of at least one urethane modified epoxy resin. In this embodiment, the functionalized modifier (M1) which modifies the epoxy resin (E1) is an isocyanate group-terminated, urethane pre-polymer obtainable by reacting a polyisocyanate compound (I) and a polyhydroxyl (P) compound. Without intention to limit this embodiment, the urethane pre-polymer (M1) should be characterized by: i) an NCO content of from 5 to 30%, preferably from 10 to 25% by weight, based on the prepolymer; and, ii) a functionality of 1.1 to 2.5. These characterizing properties may be found in known commercially available prepolymers. Alternatively, components (I) and (P) may be reacted in a ratio and under conditions such that these properties of the resultant pre-polymer are achieved.

The polyisocyanates (I) used in preparing the pre-polymer (M1) include any aliphatic, cycloaliphatic, arylaliphatic, heterocyclic or aromatic polyisocyanate, or mixture thereof, having an average isocyanate functionality of at least 2.0 and an equivalent weight of at least 80. The isocyanate functionality of the polyisocyanate (I) will more generally be from 2.2 to 4.0, for example 2.3 to 3.5. Whilst functionalities greater than 4.0 may be used, their use can cause excessive crosslinking The equivalent weight of the polyisocyanate is typically from 100 to 300, preferably from 1 10 to 250, and more preferably from 120 to 200.

The polyisocyanates, where required, may have been biuretized and / or isocyanurated by generally known methods, such as described in UK Patent No. 889,050.

Examples of suitable polyisocyanates (I) include but are not limited to: ethylene diisocyanate; 1,4-tetramethylene diisocyanate; hexamethylene diisocyanate (HDI); biuret or trimers of HDI; 1,12-dodecane diisocyanate, cyclobutane-1,3-diisocyanate cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers; hexahydrol, 3- and/or 1,4-phenylene diisocyanate; perhydro-2,5'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate (MDI); naphthylene-1,5-diisocyanate; triphenyl methane-4,4',4'-tri-isocyanate; and, polyphenyl polymethylene polyisocyanates of the type obtained by condensing aniline with formaldehyde, followed by phosgenation such as described in UK Patent Nos. 874,430 and 848,671. It is noted that di- and/or polyisocyanates comprising ester, urea, allophanate, carbodiimide, uretdione and / or urethane groups may also be used in the process according to the invention.

The polyhydroxyl compound (P) used to derive the urethane pre-polymer (M1) should conventionally have a number average molecular weight (Mn) of from 400 to 10000 g/mol. The hydroxyl number of the polyhydroxy compound (P) should conventionally be from 20 to 850 mg KOH/g and preferably from 25 to 500 mg KOH/g. Further, it is desirable that the polyhydroxy compound (P) be selected from divalent or polyvalent: polyether polyols; polyester polyols; poly(ether-ester) polyols; poly(alkylene carbonate) polyols; hydroxyl-containing polythioethers; polymer polyols; and, mixtures thereof.

Whilst diols and triols of low molecular weights, for instance from 60 to 400 or 300 g/mol., may be reactive towards isocyanates (I), these polyols are typically only used as starter molecules, chain extenders and / or crosslinking agents in a reaction mixture which contains the one or more active hydrogen compounds (P). In this regard, mention may be made: aliphatic, cycloaliphatic and/or araliphatic diols having from 2 to 14 and preferably from 4 to 10 carbon atoms, such as ethylene glycol, 1,3-propanediol, 1,4-butanediol, 1,6-hexanediol, 1,10-decanediol, o-, m- and p-dihydroxycyclohexane; diethylene glycol; dipropylene glycol; bis(2-hydroxyethyl)hydroquinone; and, triols, such as 1,2, 4-, and 1,3,5-trihydroxycyclohexane, glycerol and trimethylolpropane.

Polyether polyols are well-known in the art and include polyoxyethylene, polyoxypropylene, polyoxybutylene and polytetramethylene ether diols and triols. The polyether polyols may generally have weight average molecular weights (Mw) of from 400 to 10000 g/mol, for example from 1000 to 7000 g/mol, and be prepared by polymerizing alkylene oxides in the presence of an active hydrogen-containing initiator compound, as described in U.S. Pat. Nos. 4,269,945, 4,218,543 and 4,374,210 for instance. The alkylene oxide monomers are typically selected from the group consisting of: ethylene oxide; propylene oxide; butylene oxides; styrene oxide; epichlorohydrin; epibromohydrin; and, mixtures thereof. The active hydrogen initiators are in turn typically selected from the group consisting of: water; ethylene glycol; propylene glycol; butanediol; hexanediol; glycerin; trimethylol propane; pentaerythritol; hexanetriol; sorbitol; sucrose; hydroquinone; resorcinol; catechol; bisphenols; novolac resins; phosphoric acid; amines; and mixtures thereof.

As is known in the art, polyester polyols may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of polyhydric alcohols which are useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof. As regards the present invention, useful polyester polyols will typically have weight average molecular weights (Mw) of from 1000 to 10000 g/mol.

In an embodiment of the present invention, the reactant polyhydroxyl compound(s) (P) have an average functionality of at least 1.5, preferably at least 1.8 and more preferably at least 2.0, but no greater than 4.0, preferably no greater than about 3.5 and more preferably no greater than 3.0. Independently or additionally, the equivalent weight of the reactant polyhydroxyl compound(s) (P) is at least 200 g/eq., preferably at least 500 g/eq. and more preferably at least 1,000 g/eq. but no greater than 3500 g/eq., preferably no greater than 3000 g/eq. and more preferably no greater than 2500 g/eq.

Starting from components (P) and (I) as defined above, the polyurethane pre-polymer (M1) may be prepared under anhydrous conditions by any suitable method, such as bulk polymerization and solution polymerization. The polyhydroxyl compound(s) (P) are present therein an amount sufficient to react with most of the isocyanate groups but leaving enough isocyanate groups to correspond with the desired free isocyanate content of the urethane pre-polymer (M1). And in that embodiment where the polyhydroxyl compound(s) (P) comprise a mixture of diols and triols, the proportion of diol to triol must be chosen to achieve the desired isocyanate functionality of the urethane prepolymer (M1).

In a further and a preferred embodiment of the present invention, the two component (2K) composition is characterized in that said at least one elastomer functionalized epoxy resin b) either comprises or consists of at least one dimer acid-modified epoxy resin. The dimer acid modifier (M1) may be cyclic or non-cyclic but will conventionally be a C36 to C44 aliphatic diacid which may be prepared by the oxidative coupling of C18 to C22 unsaturated monoacids. Dimer acids obtained from the oxidative coupling of oleic acid, linoleic acid or talloil fatty acid may be mentioned as exemplary dimer acid modifiers (M1).

Having regard to the preferred embodiments discussed herein above, commercial examples of suitable elastomer modified epoxy resins include: Hypox (R) resins, including Hypox DA 323, available from CVC Thermosets; EPON 58005 and EPON 58034 available from Miller-Stephenson; JER871 and JER872, available from Mitsubishi Chemical Corporation; B-Tough A1, A2 and A3 available from available from Croda Coatings and Polymers; YD-171 and YD-172, available from Nippon Steel Chemical Co., Ltd.; and, EPU-6, EPU-7N, EPU-11F, EPU-15F, EPU-1395, EPU-738, EPU-17, EPU-17T-6 and EPU-80 available from Adeka Corporation.

c) Curative

The curative c) necessarily consists of at least one compound possessing at least two epoxide reactive groups per molecule, said curative being characterized by comprising at least one alkoxy-containing aminofunctional silicone resin. The alkoxy-containing aminofunctional silicone resin should be characterized by at least one of: i) an amine hydrogen equivalent weight of from 80 or from 100 to 1500 g/eq., preferably from 150 to 700 g/eq. for example from 200 to 500 g/eq; and, ii) a weight average molecular weight (Mw), determined by gel permeation chromatography, of from 150 to 10000 g/mol, preferably from 150 to 8,000 g/mol, for example from 150 to 5,000 g/mol.

In an important embodiment of the present invention, the curative c) comprises or consists of at least one alkoxy-containing aminofunctional silicone resin (C1) having at least two amine hydrogen atoms per molecule, having an amine hydrogen equivalent weight of from 100 to 1500 g/eq. and having a total alkoxy content (AC) of from 10 to 40 mole percent based on the number of moles of silicon, said resin (C1) comprising the units:

  (i);

  (ii);

  (iii); and,

  (iv)

wherein: each R is independently selected from a $C_1$-$C_{18}$ alkyl group, a $C_6$-$C_{18}$ aryl group, or an aminofunctional hydrocarbon group having the formula —$R^2NHR^3$ or —$R^2NHR^2NHR^3$ of which each $R^2$ is independently a $C_2$-$C_{20}$ alkylene group and $R^3$ is a $C_1$—$C_6$ alkyl group;
a, b, c, and d define the mole fractions of each unit (i) to (iv) respectively, such that a+b+c+d=1; and,
w, x, y, and z define the mole fractions of alkoxy groups such that 0≤w<1, 0≤x<2, 0≤y<3, and, 0≤z<4 and are selected to meet the above defined total alkoxy content (AC).

In preferred embodiments, each R in $C^1$ is independently selected from a $C_1$-$C_{12}$ alkyl group, a $C_6$-$C_{18}$ aryl group or aminofunctional hydrocarbon group having the formula —$R^2NHR^3$ or —$R^2NHR^2NHR^3$ of which each $R^2$ is independently a $C_2$-$C_{12}$ alkylene group and $R^3$ is a $C_1$-$C_4$ alkyl group.

In particularly preferred embodiments, each R in $C^1$ is independently selected from a $C_1$-$C_6$ alkyl group, a $C_6$-$C_{18}$ aryl group or aminofunctional hydrocarbon group having the formula —$R^1NHR^2$ or —$R^1NHR^1NHR^2$ of which each $R^1$ is independently a $C_2$-$C_8$ alkylene group and $R^2$ is a $C_1$-$C_2$ alkyl group. A definitive preference may be mentioned for aminofunctional silicone resins ($C^1$) having both methyl and phenyl substitution at R.

As noted, subscripts a, b, c, and d in the amino-functional silicone resin (C1) formulated above describe the mole fractions of each unit, such that a+b+c+d=1. Those mole fractions should meet the following conditions: i) a has a value of from 0 to 0.40, preferably from 0 to 0.20, for example from 0 to 0.10; ii) b has a value of ≥0.15, preferably a value of from 0.15 to 0.8, for example from 0.15 to 0.6; iii) c meets the condition 0<c<0.85 and preferably 0<c<0.80; and, iv) d has a value of from 0 to 0.20, preferably from 0 to 0.10, for example from 0 to 0.05.

The skilled artisan will recognize that the total alkoxy content (AC) of the alkoxy-containing aminofunctional silicone resin ($C_1$) as formulated above is represented by the sum of (wa)+(xb)+(yc)+(zd). Desirably, the total alkoxy content should be within the range of from 10 to 30 mole percent based on the number of moles of silicon in the resin and preferably in the range of from 10 to 25 mole percent or from 10 to 20 mole percent on that basis.

There is no intention to limit the methods by which the alkoxy-containing aminofunctional silicone resins (C1) defined herein above can be prepared. The disclosure of US2012/0251729 (Horstman et al.) is however instructive on exemplary synthetic processes.

Without intention to limit the present invention, the following may also be mentioned as exemplary alkoxy-containing aminofunctional silicone resins having utility as or in the curative c): γ-aminopropyltriethoxysilane; γ-aminopropyltriethoxysilane; γ-aminopropyltrimethoxysilane; γ-aminopropylsilsesquioxane; γ-aminopropyltrimethoxysilane; N-13-(aminoethyl)-γ-aminopropyltrimethoxysilane; benzylamino-silane; bis-(γ-triethoxysilylpropyl)amine; bis-(γ-trimethoxysilylpropyl)amine; N-β-(aminoethyl)-γ-aminopropylmethyldimethoxysilane; and, N-ethyl-3-trimethoxysilyl-methylpropamine.

And the following commercial alkoxy-containing aminofunctional silicone resins may also be useful: Silquest A-1130, Silquest A-1387, Silquest Y-19139, Silquest VX 225 and Silquest Y-15744, available from Momentive Performance Materials Inc; and, HP1000 and HP2000 available from Wacker Chemie.

Whilst it is preferred that the curative c) consists of or consists essentially of said alkoxy-containing aminofunctional silicone(s), the presence of other curing agents in an amount up to 10 mol. %, based on the total moles of said alkoxy-containing aminofunctional silicone(s) is not precluded by the present invention. Supplementary curatives may, in particular, include mercapto compounds having at least two mercapto groups reactive toward epoxide groups or at least one polyamine compound which does not have an alkoxy functional group.

When formulating the curable composition, it is preferred that the composition in toto be characterized by a molar ratio of epoxide-reactive groups to epoxide groups from 0.90:1 to 1.2: 1, for example from 0.9: 1 to 1.1: 1. Notably, the molar ratio of epoxide-reactive groups to epoxide groups of 1:1 is included within these stated ranges and itself represents a highly preferred molar ratio.

Additives and Adjunct Ingredients

Said compositions obtained in the present invention will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives—which independently of one another may be included in single components or both components of a two (2K) component composition—are plasticizers, stabilizers including UV stabilizers, antioxidants, tougheners, fillers, reactive diluents, drying agents, adhesion promoters, fungicides, flame retardants, rheological adjuvants, color pigments or color pastes, and/or optionally also, to a small extent, non-reactive diluents.

For completeness, it is noted that in general adjunct materials and additives which contain epoxide-reactive groups will be blended into the hardener component of a two (2K) component composition. Materials that contain epoxide groups or which are reactive with the hardener(s) are generally formulated into the epoxide-containing component of a two (2K) component composition. Unreactive materials may be formulated into either or both of the A and B components.

A "plasticizer" for the purposes of this invention is a substance that decreases the viscosity of the composition and thus facilitates its processability. Herein the plasticizer may constitute up to 10 wt. % or up to 5 wt. %, based on the total weight of the composition, and is preferably selected from the group consisting of: polydimethylsiloxanes (PDMS); diurethanes; ethers of monofunctional, linear or branched $C_4$-$C_{16}$ alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and, mixtures thereof.

Those compositions of the present invention may optionally contain a toughening rubber in the form of in the form of core-shell particles dispersed in the epoxy resin matrix. The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The shell layer partially or entirely covers the surface of the rubber particle core in the graft polymerization process. By weight, the core should constitute at least 50 wt. % of the core-shell rubber particle.

The polymeric material of the core should have a glass transition temperature ($T_g$) of no greater than 0° C. and preferably a glass transition temperature ($T_g$) of −20° C. or lower, more preferably −40° C. or lower and even more preferably −60° C. or lower. The polymer of the shell is non-elastomeric, thermoplastic or thermoset polymer having a glass transition temperature ($T_g$) of greater than room temperature, preferably greater than 30° C. and more preferably greater than 50° C.

Without intention to limit the invention, the core may be comprised of: a diene homopolymer, for example, a homopolymer of butadiene or isoprene; a diene copolymer, for example a copolymer of butadiene or isoprene with one or more ethylenically unsaturated monomers, such as vinyl aromatic monomers, (meth)acrylonitrile or (meth)acrylates; polymers based on (meth)acrylic acid ester monomers, such as polybutylacrylate; and, polysiloxane elastomers such as polydimethylsiloxane and crosslinked polydimethylsiloxane.

Similarly without intention to limit the present invention, the shell may be comprised of a polymer or copolymer of one or more monomers selected from: (meth)acrylates, such as methyl methacrylate; vinyl aromatic monomers, such as styrene; vinyl cyanides, such as acrylonitrile; unsaturated acids and anhydrides, such as acrylic acid; and, (meth)acrylamides. The polymer or copolymer used in the shell may possess acid groups that are cross-linked ionically through metal carboxylate formation, in particular through forming salts of divalent metal cations. The shell polymer or copolymer may also be covalently cross-linked by monomers having two or more double bonds per molecule.

It is preferred that any included core-shell rubber particles have an average particle size (d50) of from 10 nm to 300 nm, for example from 50 nm to 200 nm: said particle size refers to the diameter or largest dimension of a particle in a distribution of particles and is measured via dynamic light scattering.

The present application does not preclude the presence of two types of core shell rubber (CSR) particles with different particle sizes in the composition to provide a balance of key properties of the resultant cured product, including shear strength, peel strength and resin fracture toughness. In this embodiment, smaller included particles ($1^{st}$ CSR type) may have an average particle size of from 10 to 100 nm and larger included particles ($2^{nd}$ CSR type) may have an average particle size of from 120 nm to 300 nm, for example from 150 to 300 nm. The smaller core shell rubber particles should typically be employed in excess of the larger particles on a weight basis: a weight ratio of smaller CSR particles to larger CSR particles of from 3:1 to 5:1 may be employed for instance.

The core-shell rubber may be selected from commercially available products, examples of which include: Paraloid EXL 2650A, EXL 2655 and EXL2691 A, available from The Dow Chemical Company; the Kane Ace® MX series available from Kaneka Corporation, and in particular MX 120, MX 125, MX 130, MX 136, MX 551, MX553; and, METABLEN SX-006 available from Mitsubishi Rayon.

The core shell rubber particles should be included in the composition in an amount of from 0 to 10 wt. %, for example from 0 to 5 wt. % based on the total weight of the composition.

As noted, the compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B 1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 0 to 30 wt. %, and more preferably from 0 to 20 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

It is noted that compounds having metal chelating properties may be used in the compositions of the present invention to help enhance the adhesion of the cured adhesive to a substrate surface. Further, also suitable for use as adhesion promoters are the acetoacetate-functionalized modifying resins sold by King Industries under the trade name K-FLEX XM-B301.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 to 5 wt. %, based on the total weight of the composition.

The presence of solvents and non-reactive diluents in the compositions of the present invention is also not precluded where this can usefully moderate the viscosities thereof. For instance, but for illustration only, the compositions may contain one or more of: xylene; 2-methoxyethanol; dimethoxyethanol; 2-ethoxyethanol; 2-propoxyethanol; 2-isopropoxyethanol; 2-butoxyethanol; 2-phenoxyethanol; 2-benzyloxyethanol; benzyl alcohol; ethylene glycol; ethylene glycol dimethyl ether; ethylene glycol diethyl ether; ethylene glycol dibutyl ether; ethylene glycol diphenyl ether; diethylene glycol; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as Solvesso® products (available from Exxon); alkylphenols, such as tert-butylphenol, nonylphenol, dodecylphenol and 8,11,14-pentadecatrienylphenol; styrenated phenol; bisphenols; aromatic hydrocarbon resins especially those containing phenol groups, such as ethoxylated or propoxylated phenols; adipates; sebacates; phthalates; benzoates; organic phosphoric or sulfonic acid esters; and sulfonamides.

The above aside, it is preferred that said solvents and non-reactive diluents constitute in toto less than 10 wt. %, in particular less than than 5 wt. % or less than 2 wt. %, based on the total weight of the composition.

For completeness, the compositions of the present invention may comprise one or more monoamines, such as hexylamine and benzylamine.

Illustrative Embodiment of the Two Component Composition

In an exemplary embodiment of the present invention, the two component (2K) composition comprises:
(A) a first component comprising:
  from 10 to 60 wt. % of a) at least one epoxy resin selected from: glycidyl ethers of polyhydric alcohols and polyhydric phenols; glycidyl esters of polycarboxylic acids; and, epoxidized polyethylenically unsaturated hydrocarbons, esters, ethers and amides; and,
  from 1 to 40 wt. % of b) at least one elastomer modified epoxy resin having an epoxide equivalent weight of from 200 to 500 g/eq;
(B) a second component comprising:
  c) a curative which consists of at least one compound possessing at least two epoxide reactive groups per molecule, said curative being characterized by consisting of from 90 to 100 mol. % of at least one alkoxy-containing aminofunctional silicone resin and from 0 to 10 mol. % of secondary epoxide reactive compounds,
wherein said composition is characterized in that it is free of catalysts and is further characterized in that the molar ratio of epoxide reactive groups provided in said curative c) to epoxide groups is from 0.90:1 to 1.2:1, preferably from 0.9:1 to 1.1:1.

In an illustrative embodiment of the present invention, the two component (2K) composition comprises:
(A) a first component comprising:
from 10 to 60 wt. % of a) at least one epoxy resin selected from: glycidyl ethers of polyhydric alcohols and polyhydric phenols; glycidyl esters of polycarboxylic acids; and, epoxidized polyethylenically unsaturated hydrocarbons, esters, ethers and amides; and,
from 1 to 40 wt. % of b) at least one elastomer modified epoxy resin having an epoxide equivalent weight of from 200 to 500 g/eq., wherein said at least one elastomer modified epoxy resin either comprises or consists of at least one dimer acid-modified epoxy resin;
(B) a second component comprising:
c) a curative which consists of at least one compound possessing at least two epoxide reactive groups per molecule, said curative being characterized by consisting of:
from 90 to 100 mol. % of at least one alkoxy-containing aminofunctional silicone resin having an amine hydrogen equivalent weight of from 200 to 500 g/eq.; and,
from 0 to 10 mol. % of secondary epoxide reactive compounds,
wherein said composition is characterized in that it is free of catalysts and is further characterized in that the molar ratio of epoxide reactive groups provided in said curative c) to epoxide groups is from 0.90:1 to 1.2:1, preferably from 0.9:1 to 1.1:1.

METHODS AND APPLICATIONS

For the two component (2K) curable compositions, the reactive components are brought together and mixed in such a manner as to induce the hardening thereof: the reactive compounds should be mixed under sufficient shear forces to yield a homogeneous mixture. It is considered that this can be achieved without special conditions or special equipment. That said, suitable mixing devices might include: static mixing devices; magnetic stir bar apparatuses; wire whisk devices; augers; batch mixers; planetary mixers; C.W. Brabender or Banburry® style mixers; and, high shear mixers, such as blade-style blenders and rotary impellers.

For small-scale liner applications in which volumes of less than 2 liters will generally be used, the preferred packaging for the two component (2K) compositions will be side-by-side double cartridges or coaxial cartridges, in which two tubular chambers are arranged alongside one another or inside one another and are sealed with pistons: the driving of these pistons allows the components to be extruded from the cartridge, advantageously through a closely mounted static or dynamic mixer. For larger volume applications, the two components of the composition may advantageously be stored in drums or pails: in this case the two components are extruded via hydraulic presses, in particular by way of follower plates, and are supplied via pipelines to a mixing apparatus which can ensure fine and highly homogeneous mixing of the hardener and binder components. In any event, for any package it is important that the binder component be disposed with an airtight and moisture-tight seal, so that both components can be stored for a long time, ideally for 12 months or longer.

Non-limiting examples of two component dispensing apparatuses and methods that may be suitable for the present invention include those described in U.S. Pat. Nos. 6,129,244 and 8,313,006.

The two (2K) component curable compositions should broadly be formulated to exhibit an initial viscosity—determined immediately after mixing, for example, up to two minutes after mixing—of less than 200000 mPa·s, for instance less than 100000 mPa·s, at 25° C. Independently of or additional to said viscosity characteristics, the two (2K) component composition should be formulated to be bubble (foam) free upon mixing and subsequent curing. Moreover, the two component (2K) composition should further be formulated to demonstrate at least one, desirably at least two and most desirably all of the following properties: i) a long pot life, typically of at least 25 minutes and commonly of at least 60 or 120 minutes, which pot life should be understood herein to be the time after which the viscosity of a mixture at 20° C. will have risen to more than 50,000 mPas; ii) a maximum exotherm temperature of no greater than 120° C., preferably no greater than 100° C. and more preferably no greater than 80° C.; and, iii) a Shore A hardness of at least 50, preferably at 60 and more preferably at least 70 after being cured and stored for 7 days at room temperature and 50% relative humidity.

The curing of the compositions of the invention can occur at temperatures in the range of from −10° C. to 120° C., preferably from 0° C. to 70° C., and in particular from 20° C. to 60° C. The temperature that is suitable depends on the specific compounds present and the desired curing rate and can be determined in the individual case by the skilled artisan, using simple preliminary tests if necessary. Of course, curing at temperatures of from 10° C. to 35° C. or from 20° C. to 30° C. is especially advantageous as it obviates the requirement to substantially heat or cool the mixture from the usually prevailing ambient temperature. Where applicable, however, the temperature of the mixture formed from the respective components of a two (2K) component composition may be raised above the mixing temperature and/or the application temperature using conventional means including microwave induction.

The curable compositions according to the invention may find utility inter alfa in: varnishes; inks; binding agents for fibers and / or particles; the coating of glass; the coating of mineral building materials, such as lime- and / or cement-bonded plasters, gypsum-containing surfaces, fiber cement building materials and concrete; the coating and sealing of wood and wooden materials, such as chipboard, fiber board and paper; the coating of metallic surfaces; the coating of asphalt- and bitumen-containing pavements; the coating and sealing of various plastic surfaces; and, the coating of leather and textiles.

In a particularly preferred embodiment, the composition of the present invention is applied to substrates to produce an adherent, highly abrasion resistant coating. The bonding operation can often be effected a room temperature and and effective abrasion resistance can be attained after curing. Moreover, when bonding to the surface of mechanical structures or to a floor or pavement, the coating compositions can provide corrosion protection for the surface and can prevent the surface from being contacted with compounds which would be deleterious to the operation or efficiency of the specific structure.

In each of the above described applications, the compositions may applied by conventional application methods such as: brushing; roll coating using, for example, a 4-application roll equipment where the composition is solvent-free or a 2-application roll equipment for solvent-containing compositions; doctor-blade application; printing methods; and, spraying methods, including but not limited to air-atomized spray, air-assisted spray, airless spray and high-volume low-pressure spray. For coating and adhesive applications, it is recommended that the compositions be applied to a wet film thickness of from 10 to 500 μm. The application of thinner layers within this range is more economical and provides for a reduced likelihood of thick cured regions that may—for coating applications—require sanding. However, great control must be exercised in applying thinner coatings or layers so as to avoid the formation of discontinuous cured films.

For completeness, it is noted that the present invention does not preclude the preparation of epoxy adhesives in the form of "film adhesive". A pre-polymer mixture of epoxy resins, hardener, and other desired components is applied as a coating onto a polymer film substrate, rolled up and stored at a sufficiently low temperature to inhibit the chemical reactions between the components. When needed, the film adhesive is removed from the low temperature environment and applied to a metal or composite part, the backing is stripped off and the assembly completed and cured in an oven or autoclave.

The following examples are illustrative of the present invention and are not intended to limit the scope of the invention in any way.

EXAMPLES

The following commercial products were used in the Examples:
  B-tough A1: Reactive, epoxy functional toughening ingredient available from Croda Coatings and Polymers.
  Lapox Arch-11: Bis(2,3-epoxypropyl)cyclohexane-1,2-dicarboxylate available from Atul Ltd.
  Epotec YD 128: Unmodified liquid epoxy resin produced from bisphenol-A and epichlorohydrin, available from Aditya Birla Chemicals (Thailand) Ltd.
  Fluo HT: Micronized Polytetrafluroethylene available from Micro Powders Inc.
  HP2000: Amino functional methyl phenyl siloxane resin having an amine number of 2.6-2.9, available from Wacker Chemie.

The following tests were performed in the Examples:
Open Time: This was determined, at room temperature and 50% humidity, as the maximum length of time after the composition has been applied to a substrate in which an adhesive bond may be formed. For example, if the composition may be applied to a first piece of cardboard and: i) after 5 seconds, another piece of cardboard may still be applied and still bonded to the first cardboard piece; but ii) after 6 seconds, the composition may be too hard and set to form a bond between the two cardboard pieces, the open time would be 5 seconds.

Tack-free Time: This was determined by applying the coatings at a wet layer thickness of 75 μm at 23° C. and a relative humidity of 50%. The coating was considered tack free when fingerprints could no longer be observed after touching the surface with a clean and dry finger. The tack-free time was measured using a timing device.

The remaining tests (Abrasion Resistance, Corrosion Resistance and Pencil Hardness) were performed after the compositions had been permitted to cure for 24 hours at room temperature.

Abrasion Resistance: CS-17 wheels, which had been mounted on a standard Taber Abraser Model 5150 and which had each been further loaded with 1kg in weight, were used to abrade the surface of a mounted strip (10 cm by 10 cm) of substrate coated with the inventive and comparative compositions described below. The test specimens had first been cleaned to remove adhered particulate matter and then weighed prior to abrasion. For completeness, the CS-17 abrasive wheels were obtained from Byk-Gardner and were re-conditioned against S-11 re-facing discs for 50 cycles prior to each sample test. The Taber Abraser—which automatically counts cycles—was energized and abrasive wear was evaluated using a weight loss method for the samples after 3000 cycles in accordance with ASTM D4060 Standard Test Method for Abrasion Resistance of Organic Coatings by the Taber Abraser. The Examples below report Weight Loss (L, mg) as the difference in weight of the specimen before and after abrasion.

Corrosion Resistance: Salt spray testing is a standardized method to determine corrosion resistance of coatings applied to metal substrates. The present test was conducted in a salt spray cabinet, where a salted solution (5 wt. % NaCl) was atomized and sprayed onto the surface of a test panel to which the coating composition of the present invention has been applied, with lines scribed on the panel. The scribed panel was maintained in the salt fog—which duplicates a highly corrosive environment—for a period of 500 hours. Test parameters were used according to ASTM B117 Standard Practice for Operating Salt Fog Apparatus.

Pencil Hardness: The hardness of the coatings and their resistance to scratches and wear was determined in accordance with ASTM 3363 Standard Test Method for Film Hardness by Pencil Test.

Examples 1-6

The formulations presented in Table 1 herein below were prepared by using dibutyltin dilaurate (DBTDL) as catalyst (Comparative Ex. 1-2) and without catalyst (Inventive Ex. 1-6). The amount of curing agent (Part B) was varied in the given Examples. In Table 1, the amounts of Part A are given in grams (g) and the weight of Part B is given in grams per 100 grams of Part A.

TABLE 1

| Chemical | Comp. Ex. 1 | Comp. Ex. 2 | Inventive Ex. 1 | Inventive Ex. 2 | Inventive Ex. 3 | Inventive Ex. 4 | Inventive Ex. 5 | Inventive Ex. 6 |
|---|---|---|---|---|---|---|---|---|
| Part A: Stock Coating Composition ||||||||||
| B-tough A1 | 15.0 | 15.0 | 5.0 | 10.0 | 15.0 | 20.0 | 15.0 | 15.0 |
| Lapox Arch-11 | 28.0 | 28.0 | 38.0 | 33.0 | 28.0 | 23.0 | 28.0 | 28.0 |
| Silanol | 2.0 | 2.0 | 2.0 | 2.0 | 2.0 | 2.0 | 2.0 | 2.0 |
| Fluo HT | 2.0 | 2.0 | 2.0 | 2.0 | 2.0 | 2.0 | 2.0 | 2.0 |
| Silicon carbide | 48.9 | 48.4 | 49.4 | 49.4 | 49.4 | 49.4 | 49.4 | 49.4 |

TABLE 1-continued

| Chemical | Comp. Ex. 1 | Comp. Ex. 2 | Inventive Ex. 1 | Inventive Ex. 2 | Inventive Ex. 3 | Inventive Ex. 4 | Inventive Ex. 5 | Inventive Ex. 6 |
|---|---|---|---|---|---|---|---|---|
| Zinc Oxide | 1.0 | 1.0 | 1.0 | 1.0 | 1.0 | 1.0 | 1.0 | 1.0 |
| Fumed Silica | 2.5 | 2.5 | 2.5 | 2.5 | 2.5 | 2.5 | 2.5 | 2.5 |
| Carbon black | 0.1 | 0.1 | 0.1 | 0.1 | 0.1 | 0.1 | 0.1 | 0.1 |
| DBTDL | 0.5 | 1.0 | — | — | — | — | — | — |
| Part B: Curing Agent | | | | | | | | |
| [1] HP 2000 | 50 | 50 | 57 | 53 | 50 | 46 | 45 | 55 |

[1] weight of HP 2000 for 100 grams of Part-A.

The stability of the stock coating compositions was evaluated after storage for 8 weeks at 50° C. and reported in Table 2 herein below.

The two parts (A, B) as defined above were mixed and the resulting compositions were evaluated for the open time/tool time and tack free time. After curing for 24 hours room temperature, coating thickness and performance were evaluated through pencil hardness test, abrasion resistance and salt spray study.

TABLE 2

Performance Properties of the Test Formulations

| Property | Comp. Ex. 1 | Comp. Ex. 2 | Inventive Ex. 1 | Inventive Ex. 2 | Inventive Ex. 3 | Inventive Ex. 4 | Inventive Ex. 5 | Inventive Ex. 6 |
|---|---|---|---|---|---|---|---|---|
| Open time (min) | 14-16 | 9-11 | 40-50 | 40-50 | 40-50 | 40-50 | 40-50 | 40-50 |
| Tack free time (min) | 90-100 | 70-80 | 180-190 | 180-190 | 180-190 | 180-190 | 180-190 | 180-190 |
| Dry film thickness (µm) | 240-260 | 240-260 | 240-260 | 240-260 | 240-260 | 240-260 | 240-260 | 240-260 |
| Pencil hardness | 9H | 9H | 9H | 9H | 9H | 9H | 9H | 9H |
| [2] Abrasion resistance (mg) | >30 | >40 | <30 | <20 | <20 | <20 | <20 | <20 |
| [3] Storage stability | Stable | Stable | Stable | Stable | Stable | Stable | Stable | Stable |
| [4] Corrosion resistance | No blisters and no air pockets | | | | | | | |

[2] CS-17 wheels with 1 kg weight, weight loss 3000 cycles
[3] stock coating material for 8 weeks at 50° C.
[4] using salt spray: ASTMB117, after 500 hours Having regard to Table 2, the catalyst free compositions (Inventive Ex. 1-6) have a longer application time as compared to the catalyst-based compositions (Comparative Ex. 1-2): the catalyst promotes a faster reaction and thus reduces the application time. However, in the catalyst-free compositions (Inventive Ex.1-6), the reaction in the pot is very slow: the longer open time is advantageous for coating applications.

As further shown in Table 2, the tack-free time in the catalyst-free compositions (Inventive Ex.1-6) is more than 180 minutes whereas the catalyst-based compositions (Comparative Ex. 1 and 2) attain tack free time in less than 100 minutes.

Inventive Ex. 5 and 6 were performed to evaluate the tolerance limits of the compositions in varying the amount of curing agent by ±10%: no noticeable, negative effects on the properties of the cured compositions were observed.

All the above coating compositions have presented 9H hardness in pencil hardness study. The catalyst free compositions (Inventive Ex.1-6) gives very high abrasion resistance even after 3000 cycles of abrasion with 1kg weight with CS-17 Taber Abraser wheels. Conversely, the catalyst-based compositions (Comparative Ex. 1-2) show greater weight loss as compared to said inventive examples.

Corrosion resistance of the compositions was studied using the salt spray equipment for 500 hours: no blisters and no air pockets were observed on the coated panels.

Examples 7-10

The formulations presented in Table 3 herein below were prepared by using dibutyltin dilaurate (DBTDL) as catalyst (Comparative Ex. 3-4) and without catalyst (Inventive Ex. 7-10). The amount of curing agent (Part B) was varied in the given Examples. In Table 3, the amounts of Part A are given in grams (g) and the weight of Part B is given in grams per 100 grams of Part A.

TABLE 3

| No. | Chemical | Comp. Ex. 3 | Comp. Ex. 4 | Inventive Ex. 7 | Inventive Ex. 8 | Inventive Ex. 9 | Inventive Ex. 10 |
|---|---|---|---|---|---|---|---|
| Part A: Stock Coating Material | | | | | | | |
| 1 | B-tough A1 | 15.0 | 15.0 | 5.0 | 10.0 | 15.0 | 20.0 |
| 2 | Epotec YD 128 | 28.0 | 28.0 | 38.0 | 33.0 | 28.0 | 23.0 |

TABLE 3-continued

| No. | Chemical | Comp. Ex. 3 | Comp. Ex. 4 | Inventive Ex. 7 | Inventive Ex. 8 | Inventive Ex. 9 | Inventive Ex. 10 |
|---|---|---|---|---|---|---|---|
| 3 | Silanol | 2.0 | 2.0 | 2.0 | 2.0 | 2.0 | 2.0 |
| 4 | Fluo HT | 2.0 | 2.0 | 2.0 | 2.0 | 2.0 | 2.0 |
| 5 | Silicon carbide | 48.9 | 48.4 | 49.4 | 49.4 | 49.4 | 49.4 |
| 6 | Zinc Oxide | 1.0 | 1.0 | 1.0 | 1.0 | 1.0 | 1.0 |
| 7 | Fumed Silica | 2.5 | 2.5 | 2.5 | 2.5 | 2.5 | 2.5 |
| 8 | Carbon black | 0.1 | 0.1 | 0.1 | 0.1 | 0.1 | 0.1 |
| 9 | DBTDL | 0.5 | 1.0 | — | — | — | — |
| Part B: Curing agent | | | | | | | |
| 10 | [5] HP 2000 | 47 | 47 | 54 | 51 | 47 | 44 |

[5] Denotes weight of HP 2000 for 100 grams of Part-A.

The stability of the stock coating compositions was evaluated after storage for 8 weeks at 50° C. and reported in Table 4 herein below.

The two parts (A, B) as defined above were mixed and the resulting composition was evaluated for the open time/tool time and tack free time. After curing for 24 hours room temperature, coating thickness and performance were evaluated through pencil hardness test, abrasion resistance and salt spray study. The results are also given in Table 4.

TABLE 4

Performance Properties of the Test Formulations

| Property | Comp. Ex. 3 | Comp. Ex. 4 | Inventive Ex. 7 | Inventive Ex. 8 | Inventive Ex. 9 | Inventive Ex. 10 |
|---|---|---|---|---|---|---|
| Open time (min) | 15-20 | 10-15 | 50-60 | 40-50 | 40-50 | 25-35 |
| Tack free time (min) | 70-80 | 50-65 | 180-200 | 180-200 | 180-200 | 180-200 |
| Dry film thickness (μm) | 240-260 | 240-260 | 240-260 | 240-260 | 240-260 | 240-260 |
| Pencil hardness | 9H | 9H | 9H | 9H | 9H | 9H |
| [6] Abrasion resistance (mg) | >40 | >40 | <20 | <20 | <20 | <20 |
| [7] Storage stability | Stable | Stable | Stable | stable | stable | stable |
| [8] Corrosion resistance | No blisters and no air pockets | | | | | |

[6] CS-17 wheels with 1 kg weight, weight loss 3000 cycles
[7] stock coating material for 8 weeks at 50° C.
[8] using salt spray: ASTMB117, after 500 hours Having regard to Table 4, the catalyst free compositions (Inventive Ex. 7-10) have a longer application time as compared to the catalyst-based compositions (Comparative Ex. 3-4): the catalyst promotes a faster reaction and thus reduces the application time. However, in the catalyst-free compositions (Inventive Ex. 7-10), the reaction in the pot is very slow: the longer open time can be advantageous for coating applications.

As further shown in Table 4, the tack-free time in the catalyst-free compositions (Inventive Ex. 7-10) is more than 180 minutes whereas the catalyst-based compositions (Comparative Ex. 3 and 4) attain tack free time in less than 90 minutes.

All the above coating compositions have presented 9H hardness in pencil hardness study. The catalyst free compositions (Inventive Ex. 7-10) gives very high abrasion resistance even after 3000 cycles of abrasion with 1kg weight with CS-17 Taber Abraser wheels. Conversely, the catalyst-based compositions (Comparative Ex. 3-4) show greater weight loss as compared said inventive examples.

Corrosion resistance of the compositions was studied using the salt spray equipment for 500 hours: no blisters and no air pockets were observed on the coated panels.

In view of the foregoing description and examples, it will be apparent to those skilled in the art that equivalent modifications thereof can be made without departing from the scope of the claims.

What is claimed is:

1. A two component (2K) composition comprising:
    (A) a first component comprising:
        a) at least one epoxy resin different from said resin b); and,
        b) at least one elastomer modified epoxy resin in an amount of 1 to 40 wt %, based on the total weight of the first component;
    (B) a second component comprising:
        c) a curative which comprises at least one compound possessing at least two epoxide reactive groups per molecule, said curative comprising at least one alkoxy-containing aminofunctional silicone resin,
wherein said composition is free of catalyst, wherein said elastomer modified epoxy resin b) has an epoxide equivalent weight of from 200 to 2500 g/eq.

2. The two component composition according to claim 1, wherein:
    A) the first component comprises, based on weight of said first component:
        from 10 to 60 wt. % of a) said at least one epoxy resin a);
    B) the second component comprises:
        c) a curative which consists of at least one compound possessing at least two epoxide reactive groups per molecule, said curative comprising at least one alkoxy-containing aminofunctional silicone resin,
wherein said two component composition has a molar ratio of epoxide reactive groups provided in said curative c) to epoxide groups of from 0.90:1 to 1.2:1.

3. The two component composition according to claim 1, wherein said at least one epoxy resin a) is selected from: glycidyl ethers of polyhydric alcohols and polyhydric phenols; glycidyl esters of polycarboxylic acids; and, epoxidized polyethylenically unsaturated hydrocarbons, esters, ethers and amides.

4. The two component composition according to claim 1, wherein said elastomer modified epoxy resin b) has an epoxide equivalent weight of from 200 to 500 g/eq.

5. The two component composition according to claim 1, wherein said at least one elastomer modified epoxy resin b) comprises at least one dimer acid-modified epoxy resin.

6. The two component composition according to claim 5, wherein said at least one dimer acid-modified epoxy resin is a reaction product of catalyzed addition reaction between an epoxide compound and C36 to C44 aliphatic diacid.

7. The two component composition according to claim 1, wherein said curative c) consists of:
    from 90 to 100 mol. % of said at least one alkoxy-containing aminofunctional silicone resin(s); and
    from 0 to 10 mol. % of secondary epoxide reactive compounds.

8. The two component composition according to claim 1, wherein said alkoxy-containing aminofunctional silicone resin has:
    i) an amine hydrogen equivalent weight of from 100 to 1500 g/eq; or, ii) a weight average molecular weight (Mw), determined by gel permeation chromatography, of from 150 to 10000 g/mol.

9. The two component composition according to claim 1, wherein said two component composition has a molar ratio of epoxide reactive groups provided in said curative c) to epoxide groups of from 0.9:1 to 1.1:1.

10. A method of coating, sealing or bonding at least one substrate comprising steps of:
   1) Mixing component A and component B of the two component composition according to claim 1 to form an uncured mixture;
   2) Applying the uncured mixture to at least one substrate surface;
   3) Reacting the uncured mixture thereby forming a cured reaction product;
   wherein the uncured mixture is applied in an amount sufficient to produce a continuous cured film of the cured reaction product as a coating, sealant or adhesive.

11. The method of coating, sealing or bonding of claim 10 further comprising a step of bringing said at least one substrate surface of step 2) comprising the uncured mixture into contact with a surface-to-be-bonded to the at least one substrate surface.

12. The method of coating, sealing or bonding of claim 10, wherein reacting the uncured mixture comprises crosslinking.

13. A cured product obtained from the two component (2K) composition as defined in claim 1.

14. The two component composition according to claim 1, wherein said curative c) comprises at least one alkoxy-containing aminofunctional silicone resin having at least two amine hydrogen atoms per molecule, having an amine hydrogen equivalent weight of from 100 to 1500 g/eq. and having a total alkoxy content (AC) of from 10 to 40 mole percent based on number of moles of silicon.

15. The two component composition according to claim 14, wherein the aminofunctional silicone resin has both a methyl substitution and a phenyl substitution.

16. The two component composition according to claim 1, wherein:
   A) the first component comprises, based on weight of said first component:
      from 10 to 60 wt. % of a) said at least one epoxy resin a);
   B) the second component comprises:
      c) a curative which consists of at least one compound possessing at least two epoxide reactive groups per molecule, said curative comprising at least one alkoxy-containing aminofunctional silicone resin,
   wherein said two component composition has a molar ratio of epoxide reactive groups provided in said curative c) to epoxide groups of from 0.90:1 to 1.2:1, and wherein said at least one elastomer modified epoxy resin b) comprises at least one dimer acid-modified epoxy resin.

17. The two component composition according to claim 15, wherein said at least one dimer acid-modified epoxy resin is a reaction product of catalyzed addition reaction between an epoxide compound and C36 to C44 aliphatic diacid.

* * * * *